US006917815B2

(12) United States Patent
Hajimiri et al.

(10) Patent No.: US 6,917,815 B2
(45) Date of Patent: Jul. 12, 2005

(54) CONCURRENT DUAL-BAND RECEIVER ARCHITECTURE

(75) Inventors: Seyed-Ali Hajimiri, Pasadena, CA (US); Seyed-Hossein Hashemi, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 482 days.

(21) Appl. No.: 10/027,372

(22) Filed: Dec. 19, 2001

(65) Prior Publication Data

US 2002/0173337 A1 Nov. 21, 2002

Related U.S. Application Data

(60) Provisional application No. 60/275,894, filed on Mar. 14, 2001.

(51) Int. Cl.[7] .............................. H04B 1/38; H04M 1/00
(52) U.S. Cl. ...................... 455/552.1; 455/285; 455/302
(58) Field of Search .......................... 455/552.1, 553.1, 455/207, 209, 285, 302, 303, 304, 306, 313–315

(56) References Cited

U.S. PATENT DOCUMENTS

| 5,592,122 | A | 1/1997 | Masahiro et al. ............ 330/286 |
| 5,973,568 | A | 10/1999 | Shapiro et al. .............. 330/295 |
| 5,995,814 | A | 11/1999 | Yeh .......................... 455/180.1 |
| 6,054,902 | A | 4/2000 | Masato ....................... 330/306 |
| 6,075,996 | A | 6/2000 | Srinivas ...................... 455/552 |
| 6,329,886 | B1 | 12/2001 | Ogoro .......................... 333/32 |
| 6,384,688 | B1 | 5/2002 | Fujioka et al. .............. 330/302 |
| 6,392,491 | B1 | 5/2002 | Ohkawa et al. ............. 330/306 |
| 2003/0181187 | A1 * | 9/2003 | Liu ............................. 455/302 |
| 2003/0193923 | A1 * | 10/2003 | Abdelgany et al. .......... 370/342 |

FOREIGN PATENT DOCUMENTS

| DE | 197 32 459 A1 | 2/1999 |
| DE | 198 38 244 A1 | 2/2000 |
| EP | 0 886 384 A2 | 12/1998 |
| JP | 05037255 | 2/1993 |
| WO | WO 00/76060 | 12/2000 |

OTHER PUBLICATIONS

Crois, Jan. et al., *A Single–Chip 900 MHz CMOS Receiver Front–End with a High Performance Low–IF Topology*, IEEE Journal of Solid–State Circuits, vol. 30, No. 12, 1483–1492 (Dec. 1995).

Devlin, Liam *Mixers*, Plextex Communications Technology Consultants, London Road, Great Chesterford, Essex.

Hashemi, et al., *Concurrent Dual–Band CMOS Low Noise Amplifiers and Receiver Architectures*, Department of Electrical Engineering, California Institute of Technology, Pasadena, CA, USA.

Henderson, Bert C., et al., *Image–Reject and Single–Sideband Mixers*, WJ Tech Notes, Watkins–Johnson Company vol. 12 No. 3, (May–Jun. 1985, revised and reprinted 2001).

Montemayor, Raymond, et al., *A Self–Calibrating 900 MHz CMOS Image–Reject Receiver*, Electrical Engineering Department, University of California, Los Angeles.

(Continued)

*Primary Examiner*—Sonny Trinh
*Assistant Examiner*—Un C Cho
(74) *Attorney, Agent, or Firm*—Christopher J. Rourk; Godwin Gruber LLP

(57) ABSTRACT

The present invention discloses an architecture for a concurrent dual-band high-frequency receiver. The invention combines a concurrent dual-band front-end subsystem having a dual-band antenna, dual-band pre-amplifier filter and concurrent dual-band LNA with a novel image rejection downconverter to provide the functions of a typical receiver, including reception, amplification and downconversion of a signal in two discrete desired frequency bands simultaneously.

9 Claims, 7 Drawing Sheets

OTHER PUBLICATIONS

Rudell, Jacques C., et al., *Recent Developments in High Integration Multi–Standard CMOS Transceivers for Personal Communications Systems,* Department of Electrical Engineering and Computer Sciences, University of California at Berkeley.

Weaver, Jr., Donald K., *A Third Method of Generation and Detection of Single–Sideband Signals,* Proceedings of the IRE, 1703–1705, (Dec. 1956).

Wu, Stephen, et al., *A 900–MHz/1.8–GHz CMOS Receiver for Dual–Band Applications,* 1998 IEEE International Solid–State Circuits Conference, Session 8, Wireless Receivers (Paper FA 8.2).

Wu, Stephen, et al., *A 900–MHz/1.8–GHz CMOS Receiver for Dual–Band Applications,* 1998 IEEE Journal of Solid-State Circuits, vol. 33, No. 12, 2178–2185, (Dec. 1998).

Search Report for PCT/US01/49805 dated Sep. 19, 2002.

Fong, K. *Dual–Band High–Linearity Variable–Gain Low–Noise Amplifiers for Wireless Applications,* ISSCC Digest, TP 13.3 (Feb. 1999).

Liu et al., *Dual–Frequency Planer Inverted–F Antenna,* IEEE Trans. Ant. Propl, vol. 45, No. 10, pp 1451–58 (Oct. 1997).

Miyake et al., *A Miniaturized Monolithic Dual Band Filter Using Ceramic Lamination Technique for Dual Mode Portable Telephones,* IEEE MTT–S, pp 789–92 (1997).

Pozar et al., *A Dual–Band Circularly Polarized Aperture-Coupled Stacked Microstrip Antenna for Globe Positioning Satellite,* IEEE Trans. Ant. Prop., vol. 45, No. 11, pp 1618–25 (Nov. 1997).

Razavi, B., *A 900–MHz/1.8–GHz CMOS Transmitter for Dual–Band Applications,* IEEE Journal of Solid–State Circuits, vol. 35, No. 5 (May 1999).

Ryynänen et al., *A Dual–Band RF Front–End for WCDMA and GSM Applications,* CICC digest of Technical Papers, pp 175–8 (May 2000).

Samavati et al., *A 5–GHz CMOS Wireless LAN Receiver Front End,* IEEE JSSC, vol. 35, No. 5, pp 765–72 (May 2000).

Shaeffer et al., *A 1.5–V, 1.5–GHz CMOS Low Noise Amplifier,* IEEE JSSC, vol. 32, No. 5, pp 745–59 (May 1997).

Wu et al., FA 8.2: *A 900 MHz/1.8 GHz CMOS Receiver for Dual Band Applications,* ISSCC Digest, pp 8.2–8.208 (Feb. 1998).

Devlin, Liam *Mixers,* Plextex Communications Technology Consultants, London Road, Great Chesterford, Essex.

Hashemi, et al., *Concurrent Dual–Band CMOS Low Noise Amplifiers and Receiver Architectures,* Department of Electrical Engineering, California Institute of Technology, Pasadena, CA, USA.

Montemayor, Raymond, et al., *Self–Calibrating 900 MHz CMOS Image–Reject Receiver,* Electrical Engineering Department, University of California, Los Angeles.

Rudell, Jacques C., et al., *Recent Developments in High Integration Multi–Standard CMOS Transceivers for Personal Communications Systems,* Department of Electrical Engineering and Computer Sciences, University of California at Berkeley.

* cited by examiner

CONCURRENT DUAL-BAND RECEIVER ARCHITECTURE

CROSS-REFERENCE TO RELATED APPLICATION

This application claims the benefit of U.S. Provisional Application No. 60/275,894, filed Mar. 14, 2001.

FIELD OF THE INVENTION

This invention relates to the field of high frequency receivers and more particularly to architectures for wireless receivers that can operate at two frequency bands simultaneously.

BACKGROUND OF THE INVENTION

Wireless communications systems have exhibited remarkable growth over the past decade. Wireless voice and data applications are being enabled by rapidly emerging wireless technologies, such as cellular telephony, personal communications systems, bluetooth and wireless local area networks (WLAN's), to name a few. Digital modulation techniques, miniaturization of transceivers due to advances in monolithic integrated circuit designs and the development of high frequency, microwave and millimeter wave RF systems in both the licensed and unlicensed bands, have all contributed to improving the quality and bandwidth capacity of these systems and to reducing the size and costs of the components.

These systems are having a profound effect on societies. For example, they are enabling service-based economy work forces to become "untethered" from their information sources and conventional wired communications mechanisms. Moreover, throughout the world, wireless communication systems are enabling developing countries to provide instant telephone service to new subscribers who otherwise would have to wait years for wireline access.

Dual band receivers have been introduced to the marketplace that increase the functionality of such communication systems. These receivers can receive only one band at a time and thus must switch between the two different bands. FIG. 1 is a conceptual schematic of such a conventional non-concurrent, heterodyne dual band architecture 10. As seen, an incoming signal, $V_{in}$, is received at a switch 12 (for simplicity the antenna and front-end filter are not shown). If the signal is in a first predetermined frequency band, $\omega_1$, the switch moves to the top signal processing path tuned to match and amplify signals only in this band. The signal is then impedance matched and amplified at low noise amplifier ("LNA") 20, filtered at band pass filter ("BPF") 21, mixed with local oscillator signal, $LO_1$, at mixer 22, filtered at $BPF_2$ 24 and mixed again with a second local oscillator signal, $LO_2$, at mixer 26, until it exits as $V_{out1}$ (e.g. baseband or some low frequency) for further processing (e.g. digital signal processing). If the incoming signal is in the second predetermined frequency band, $\omega_2$, the switch 12 moves to the bottom signal processing path tuned to match and amplify signals only in this band. In particular, the signal is amplified by LNA 30, filtered at $BPF_3$ 31, mixed with a third local osillator tuned to $\omega'_{LO1}$ at mixer 32, filtered again at $BPF_4$ 34 and mixed again with a fourth local oscillator tuned to $\omega'_{LO2}$ at mixer 36 and exists as $V_{out2}$. In the example shown, the four oscillators are completely independent devices. While such functionality adds to a device's versatility, such as in the case of a dual-band digital cellular phone, these receivers are very inefficient in terms of component parts and power consumption and would not satisfy the needs for the next-generation of multi-functional devices, such as a cell phone with a GPS receiver and a bluetooth interface.

Another problem with conventional wireless technology relates to bandwidth limitations. The diverse range of modern wireless applications demand wireless communications systems and transceivers with greater bandwidth capacity and flexibility than can be conventionally supplied. Increased bandwidth capacity is necessary for many wireless applications to become a reality. Wireless broadband Internet applications (e.g. browsing, e-commerce, streaming audio and video), wireless video messaging, wireless video games, and remote video monitoring are just a few examples of applications that will be delivered over the next generations of wireless networks. Conventional solid-state radio frequency ("RF" or "wireless") receiver architectures, such as superheterodyne and direct conversion receivers, accomplish high selectivity and sensitivity by designing them for narrow-band operation at a single RF frequency. Unfortunately, these modes of operation are of limited functionality because they limit the system's available bandwidth and robustness to channel variations. On the other hand, wide-band modes of operation are more sensitive to out-of-band signals due to transistor non-linearity, which can introduce severe bottlenecks in system performance.

Thus, to overcome these and other drawbacks, it would be highly desirable to have a low cost, concurrent dual-band receiver. As used herein a concurrent dual-band receiver is one that can process signals at two discrete frequency bands simultaneously, or substantially simultaneously. This would enable a receiver to significantly increase its bandwidth capacity (bit rate). A concurrent dual-band receiver design could also be used for supplying redundancy in mission critical data transmission application. The reliability of the received signal would be greatly increased with simultaneous transmission of the same signal in multiple bands, because channel properties are different and uncorrelated at two frequency bands and more diversity is achieved.

A further challenge for modem receiver design is to create true concurrent dual-band functionality using as little real estate (and ideally monolithically) and as little power dissipation as possible (and perhaps no more than single band receivers), while keeping the incremental production costs above the conventional single band receiver to a minimum.

SUMMARY OF THE INVENTION

The present invention, which addresses these needs, resides in a concurrent, dual-band receiver architecture that is capable of simultaneous operation at two different frequencies without dissipating twice as much power or a significant increase in cost and footprint. This concurrent operation can be used to extend the available bandwidth, provide new functionality and/or add diversity to battle channel fading. These new concurrent multi-band receivers provide at multiple frequency bands simultaneous 1) narrow-band gain and matching, and 2) image rejection downconversion.

In accordance with the present invention a concurrent, dual-band receiver that receives a signal at two discrete desired frequency bands, simultaneously, is disclosed. The receiver includes a concurrent, dual-band, front-end subsystem and a concurrent, dual-band, image-rejection, frequency downconverter. The front-end subsystem produces an RF signal having signal attenuation regions at frequency bands outside the two desired frequency bands.

In particular, the downconverter includes first and subsequent image-rejection downconversion stages. The first downconversion stage receives the RF signal from the front end subsystem and is adapted to simultaneously downconvert the RF signal at two frequency bands to two intermediate frequency (IF) bands such that the image frequency bands of the two desired frequency bands fall at the attenuation region of the front-end transfer function. The subsequent image rejection downconversion stage downconverts the two IF bands down to either baseband or to a desired low frequency.

More particularly, the front-end subsystem includes a concurrent, dual-band antenna, a concurrent, dual-band bandpass filter connected to the antenna that receives the dual-band signal from the antenna, and a concurrent, dual-band LNA connected to the filter that provides simultaneous gain and impedance matching at the multiple bands while maintaining a relatively low noise figure.

Also, disclosed is a concurrent, dual-band, image-rejection downconverter for a concurrent dual-band RF receiver having a front-end subsystem that supplies a front-end signal having two discrete desired frequency bands and attentuation regions at frequency bands outside the two discrete desired frequency bands. The downconverter includes a first image-rejection downconversion stage that receives and that is adapted to simultaneously downconvert the front-end signal to two intermediate frequency (IF) bands such that the image frequency bands of the two desired frequency bands fall at the attenuation regions of the front-end signal, and a subsequent image-rejection downconversion stage that downconverts the two IF bands.

In one preferred embodiment, the first downconversion stage includes a first quadrature local oscillator ($LO_1$) block and two mixers. The $LO_1$ block is adapted to supply an in-phase (I) signal and a quadrature (Q) signal of a first predetermined frequency. The first mixer is connected to the $LO_1$ block and the front-end subsystem and is adapted to mix the in-phase $LO_1$ signal with the front-end signal and to supply a resultant in-phase intermediate frequency (IF) signal. The second mixer is connected to the $LO_1$ block and the front-end subsystem and is adapted to mix the quadrature $LO_1$ signal with the front-end signal and to supply a resultant quadrature IF signal. The first predetermined frequency of the $LO_1$ block is offset from the midpoint of the two desired bands such that the image frequency bands of the two desired bands fall at attenuation regions of the front-end signal. In this way, the images are significantly attenuated prior to the subsequent amplification, filtering and downconversion stages.

In the preferred embodiment, the downconverter further includes an in-phase IF filtering and amplification stage connected to the first mixer and a quadrature IF filtering and amplification stage connected to the second mixer.

In a more detailed embodiment of the present invention, the subsequent downconversion stage is a second and last stage. It includes a second quadrature local oscillator ($LO_2$) block adapted produce an in-phase (I) signal and a quadrature (Q) signal at a second given frequency, a first intermediate frequency (IF) mixing stage connected to the $LO_2$ block and the first mixer that is adapted to mix the in-phase intermediate frequency (IF) signal with the in-phase signal of the $LO_2$ block and to supply a resultant first low frequency (LF) signal, and a second IF mixing stage connected to the $LO_2$ block and the second mixer that is adapted to mix the quadrature signal of the $LO_2$ block with the quadrature IF signal and to supply a resultant second LF signal. It also includes a third quadrature local oscillator ($LO_3$) block adapted produce an in-phase (I) signal and a quadrature (Q) signal at a third given frequency, a third IF mixing stage connected to the $LO_3$ block and the first mixer that is adapted to mix the in-phase $LO_3$ signal with the in-phase IF signal and to supply a resultant third LF signal, and a fourth IF mixing stage connected to the $LO_3$ block and the second mixer that is adapted to mix the quadrature $LO_3$ signal with the quadrature IF signal and to supply a resultant fourth LF signal.

The downconverter further includes a first summing circuit that combines the first and second LF signals to constructively add the first desired baseband signal and destructively combine the baseband image signal associated with the first desired baseband signal. The downconverter also includes a second summing circuit that combines the third and fourth LF signals to constructively add the second desired baseband signal and destructively combine the baseband image signal associated with the second desired baseband signal. In yet more detail, the first IF mixing stage includes a first IF mixer, the second IF mixing stage includes a second IF mixer, the third IF mixing stage includes a third IF mixer and the fourth IF mixing stage includes a fourth IF mixer.

However, in an even more detailed embodiment of the present invention, the downconverter's the first IF mixing stage includes a first IF mixer that mixes the in-phase IF signal with in-phase $LO_2$ signal, and a fifth IF mixer that mixes the in-phase IF signal with quadrature $LO_2$ signal, the second IF mixing stage includes a second mixer that mixes the quadrature IF signal with the quadrature $LO_2$ signal and a sixth IF mixer that mixes the quadrature IF signal with the in-phase $LO_2$ signal, the third IF mixing stage includes a third mixer that mixes the in-phase IF signal with the in-phase $LO_3$ signal and a seventh mixer that mixes the in-phase IF signal with the quadrature $LO_3$ signal, and the fourth IF mixing stage includes a fourth mixer that mixes the quadrature IF signal with the quadrature $LO_3$ signal and an eighth mixer that mixes the quadrature IF signal with the in-phase $LO_3$ signal.

In this more detailed embodiment, the downconverter further includes a first summing circuit that sums the outputs of the first and second mixers, a second summer that sums the outputs of the fifth and sixth mixers, a third summing circuit that sums the outputs of the third and fourth mixers, and a fourth summing circuit that sums the outputs of the seventh and eighth mixers.

In a more detailed aspect of the first downconversion stage of the present invention, a front-end signal phase shifter is connected to the front-end subsystem that provides a quadrature front-end signal along a quadrature front-end signal path. The stage also includes a first local oscillator ($LO_1$) block dapted to supply an in-phase (I) signal of a first predetermined frequency, a first mixer connected to the $LO_1$ block and the front-end subsystem that is adapted to mix the $LO_1$ signal with the front-end signal and to supply a resultant in-phase intermediate frequency (IF) signal; and a second mixer connected to the $LO_1$ block and the front-end phase-shifter and adapted to mix the $LO_1$ signal with the quadrature front-end signal and to supply a resultant quadrature IF signal.

A method of concurrently dowconvertering a dual-band RF signal is also dislcosed. The method includes providing a dual-band RF signal having a front-end transfer function having two desired frequency bands and attenuation notches at undesired frequency bands, and downconverting the RF signal such that the image frequencies of the two-bands fall at the attenuation notches of the front end transfer function.

More particularly, the downconverting step includes splitting the RF signal to first and second signal processing paths, mixing the RF signal on the first path with an in-phase first local oscillator ($LO_1$) signal to produce an in-phase intermediate frequency (IF) signal, filtering the in-phase IF signal, mixing the RF signal on the second path with a quadrature $LO_1$ signal to produce a quadrature IF signal, filtering the quadrature IF signal, mixing the filtered in-phase IF signal with an in-phase second local oscillator ($LO_2$) signal, mixing the filtered quadrature IF signal with the a quadrature $LO_2$ signal, mixing the filtered in-phase IF signal with an in-phase $LO_3$ signal; mixing the filtered quadrature IF signal with the quadrature $LO_3$ signal; adding the mixed in-phase $LO_2$ signal to the quadrature $LO_2$ signal, and subtracting the mixed in-phase $LO_3$ signal from the mixed quadrature $LO_3$ signal.

Other features and advantages of the present invention should become more apparent from the following description of the preferred embodiments, taken in conjunction with the accompanying drawings, which illustrate, by way of example, the principles of the invention.

BRIEF DESCRIPTION OF THE DRAWINGS

FIG. 7($b$) is a graph of the frequency domain signal of the concurrent, dual-band receiver of FIG. 6 after the first downconversion stage, but before the second downconversion stage;

FIG. 7($c$) is a graph of the frequency domain signal of the dual band receiver of FIG. 6 at the output of the downconverter;

DETAILED DESCRIPTION OF THE PREFERRED EMBODIMENTS

The invention summarized above and defined by the enumerated claims may be better understood by referring to the following detailed description, which should be read in conjunction with the accompanying drawings. This detailed description of particular preferred embodiments, set out below to enable one to build and use particular implementations of the invention, is not intended to limit the enumerated claims, but to serve as a particular examples thereof. The particular example set out below is the preferred specific implementations of a concurrent dual-band high frequency RF receiver and methods for designing the same. It should be understood however, that this system and technique is not limited to dual-band receivers, but may be extended to other applications, such as transmitters and transceivers. It should also be understood that the term "concurrent" refers to the ability to process a signal having two frequency bands of interest simultaneously or substantially simultaneously.

Figure 1:
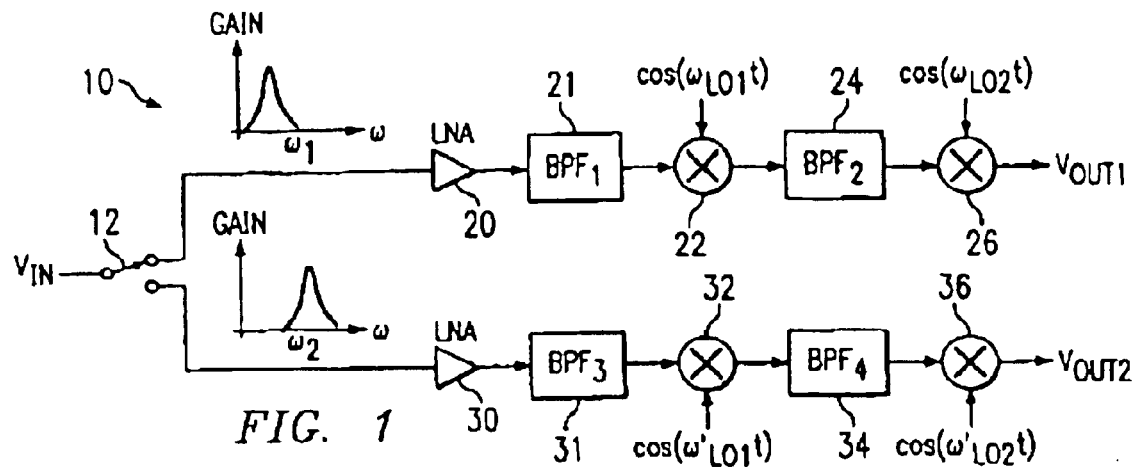
FIG. 1 is a conceptual schematic of a conventional, non-concurrent dual-band receiver architecture that is designed to switch from one band to the other.
Figure 2:
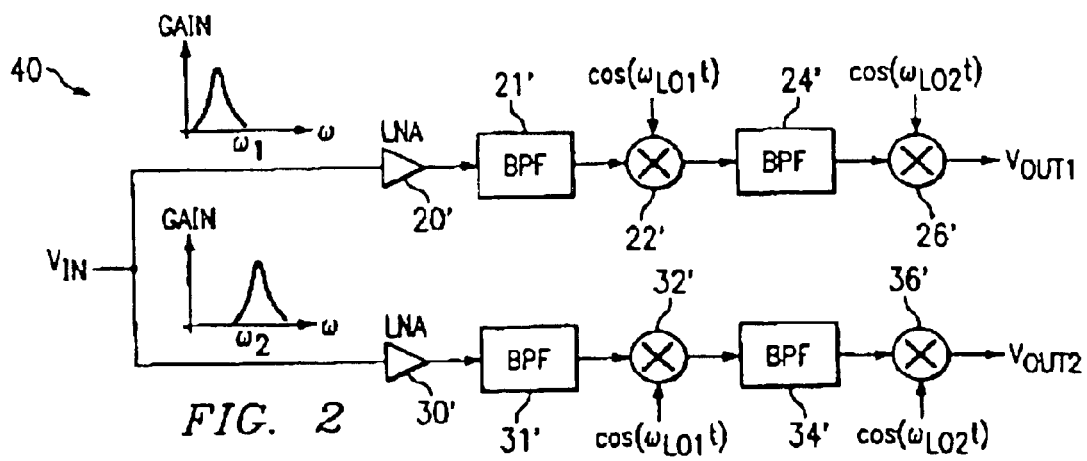
FIG. 2 is conceptual schematic of a concurrent dual-band receiver that has two independent paths.

Using conventional receiver technology, a way to provide concurrent dual-band functionality is to design into a receiver two independent signal paths with two sets of components (antennas, bandpass filters, LNA's, downconverters, etc.), each tuned for a discrete frequency band. For example, a dual-band receiver 40 using two parallel heterodyne receiver paths is shown schematically in FIG. 2. As shown, this design is similar to the dual band receiver architecture shown in FIG. 1 without the switch 12. Moreover, as as a further improvement, as is known in the art, the first and second local oscillators, $LO_1$ and $LO_2$, are shared by the top and bottom signal paths affording a savings of two local oscillators as compared with the design in FIG. 1. The frequency of $LO_1$, $\omega_{LO1}$, is $$\frac{\omega_1 + \omega_2}{2}$$

and the frequency of $LO_2$, $\omega_{LO2}$, is $$\frac{\omega_1 - \omega_2}{2}.$$

This scheme is essentially equivalent to designing multiple single band, heterodyne receivers, each tuned to a different band and stuffed into one package. Unfortunately, this architecture significantly increases the cost, footprint and power dissipation of a receiver, as compared with a single path architecture.

Figure 4:
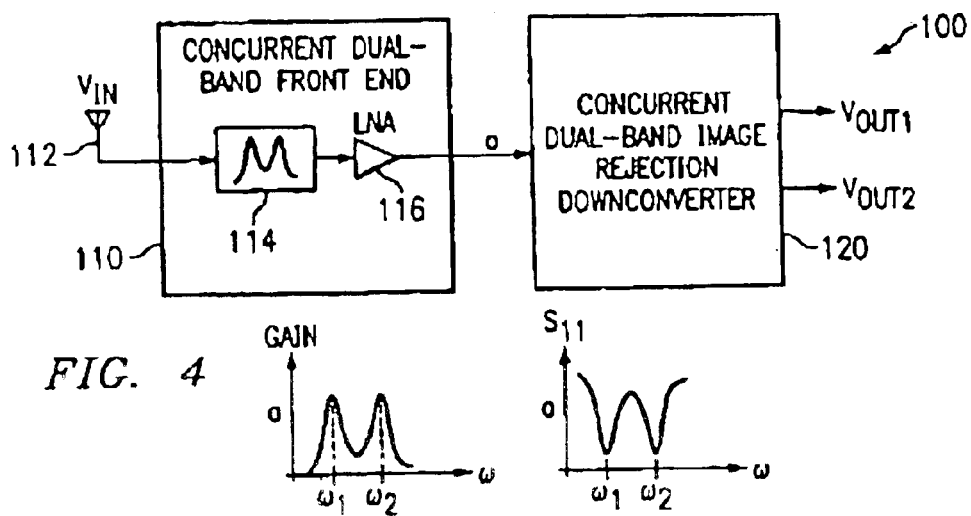
FIG. 4 is a conceptual schematic showing a primary goal of the present invention, namely, a concurrent dual-band front-end subsystem of a receiver feeding a concurrent dual-band image rejection downconverter having two ouputs.

A primary objective of the present invention is to create, as shown in FIG. 4, a concurrent dual-band receiver 100 that comprises a concurrent dual-band front-end subsystem 110 connected to a concurrent, dual band downconverter 120. It should be understood that, preferably, in order to achieve a truly concurrent dual-band receiver with maximum efficiency using minimum real estate and power consumption, as many components of the receiver as possible, namely, the antenna 112, pre-LNA filter 114, and LNA 116 of the front end subsystem, as well as the downconverter 120, should function as concurrent dual-band components. The receiver should have two separate outputs $V_{out1}$ and $V_{out2}$, that can substantially simultaneously provide baseband or near baseband outputs extracted from the two desired frequency bands. The front-end subsystem and downconverter of such a receiver will now be discussed.

1. The Dual-band Front End Subsystem

A concurrent, dual-band front-end subsystem became possible with the advent of the concurrent multi-band LNA, disclosed in pending U.S. patent application Ser. No. 09/821,403, filed on Mar. 14, 2001 and titled "Concurrent Multi-Band Low Noise Amplifier Architecture" by the inventors of the present invention. A very important observation made there was that the transconductance of the active device of the LNA is wideband and can be used to provide gain and matching at other frequencies of interest without any penalty in power dissipation. This observation led to several topologies for dual-band LNA's that provide simultaneous gain and matching at two bands (as seen in the graphs of FIG. 4), triple band LNA's and more generally multi-band LNA's. A detailed description of the dual-band LNA is described in sections 4 and 5, below.

The other components of a concurrent dual-band front-end subsystem have been disclosed in the art. For example, concurrent dual-band antennas were disclosed in D. M. Pozar et al., "A Dual Band Circularly Polarized Aperture-Coupled Stacked Microstrip Antenna for Global Positioning Satellite," *IEEE Trans. Antennas Propagation*, vol. 45, no. 10, pp. 1618–1625, October 1997; Zi D. Liu et al., "Dual-Frequency Planar Inverted-F Antenna," *IEEE Trans. Antennas Propagation*, vol. 45, no. 10 pp. 1451–1458, October 1997; and L. Zaid, et al., "Dual-Frequency and Broad-Band Antennas with Stacked Quarter Wavelength Elements," *IEEE Trans. Antennas Propagation*, vol. 47, no. 4, April 1999. Moreover, a monolithic dual-band filter has also been disclosed in H. Miyake et al., "A Miniaturized Monolithic Dual Band Filter Using Ceramic Laminations Technique for Dual Mode Portable Telephones," *IEEE Microwave Millimeter-Wave Monolithic Circuits Symp. Dig.*, pp. 789–792, 1997. Thus, the components for the entire front-end subsystem of the concurrent dual-band receiver are available.

2. The Dual-band Downconverter

The present invention completes the missing piece of the concurrent dual-band receiver by disclosing a novel, concurrent, dual-band, image-rejection downconverter. In the preferred embodiment, this downconverter receives the amplified and filtered dual-band signal from the front-end subsystem and converts each band substantially simultaneously first to an intermediate frequency and then to a low enough frequency to be processed while rejecting substantially all of the image frequencies.

Figure 3:
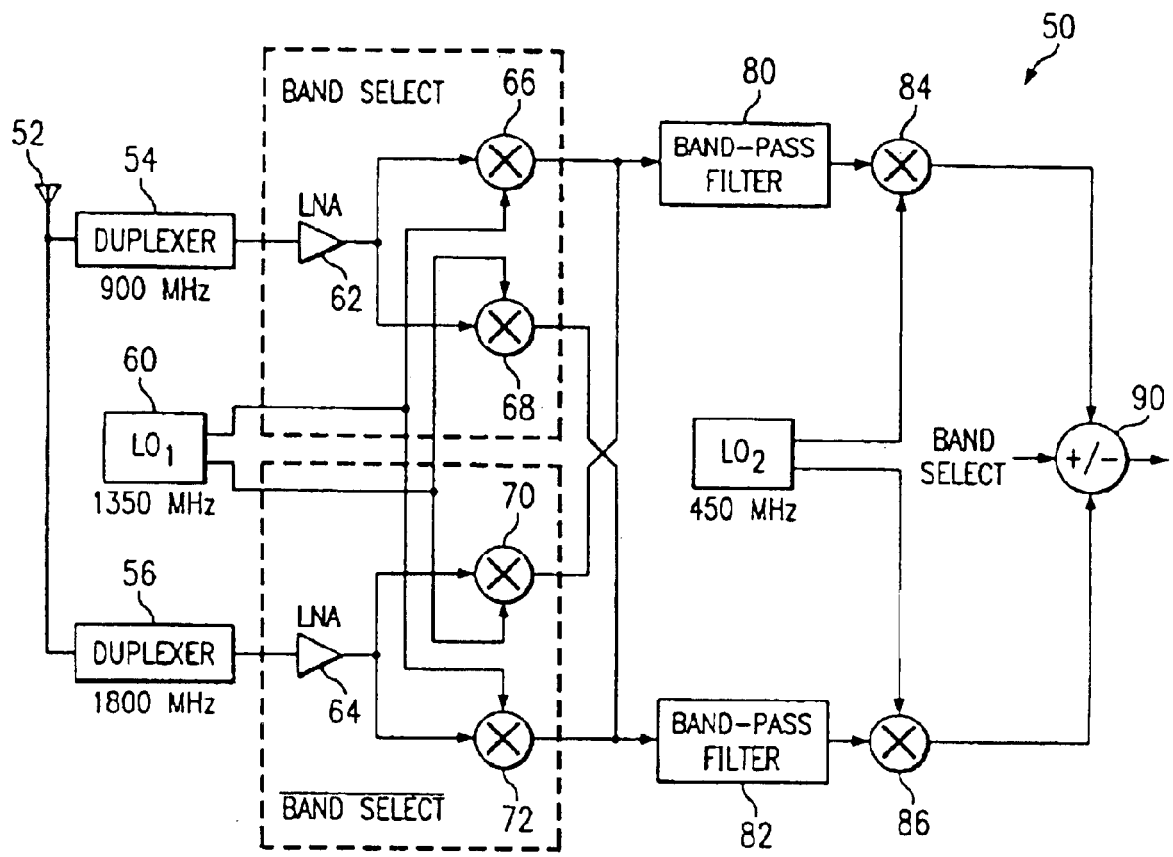
FIG. 3 is a schematic of a non-concurrent dual band receiver that uses the "Weaver" image-rejection architecture.

Numerous downconversion schemes are known in the art. One such family of schemes is known as single sideband image rejection. One well-known image rejection scheme disclosed by Weaver (See Weaver, Jr., D., "A Third Method of Generation and Detection of Single Sideband Signals," *Proceedings of the IRE*, pp. 1703–1705, June 1956), and hereinafter referred to as "the Weaver architecture", is now reviewed. The Weaver architecture performs two consecutive quadrature downconversion operations on the received signal and its image is fed from the front-end such that if the final outputs are added together the signal is obtained and the image is suppressed, and if the outputs are subtracted, the image is obtained and the signal is suppressed. This solution was applied by Wu, et al. in "A 900-MHz/1.8 GHz CMOS Receiver for Dual-Band Applications," *IEEE Journal of Solid-State Circuits*, Vol. 3, No. 12, (December 1998), for the design of a non-concurrent dual-band receiver 50. As shown in FIG. 3, in this design, the frequency of the first local oscillator $LO_1$ 60 is chosen halfway between the two frequencies bands and the particular frequency of interest is alternately selected by choosing the appropriate sideband produced by an image separation mixer.

As stated in Wu, et al., the signal received by the antenna 52 in each band is applied to a duplexer filter 54, 56 to perform band selection. Subsequently, a low noise amplifier (LNA) 62, 64 and two quadrature mixers 66, 68 and 70, 72 boost and translate the signal to an IF of 450 MHz. The results of the two bands are combined at this IF and undergo a second quadrature downconversion operation as in the conventional Weaver design. The LNA and RF mixers of the two bands are separate to allow flexibility in the choice of device dimensions and bias currents, thus optimizing the performance of each path independently. For the second downconversion, two sets of quadrature downconversion mixers 84, 86 have been used to provide both I and Q baseband outputs. The bandpass filters 80, 82 are formed by means of on-chip inductors and parasitic capacitances, but they do not perform channel selection.

In the receiver of FIG. 3, the first LO frequency is set midway between the GSM and DCS1800 bands, making the two bands images of each other. That is, the RF mixing uses high-side injection for GSM and low-side injection for DCS1800. The band-select input switches the receiver between the two operating modes (GSM or DCS 1800), shutting off the RF path of the idle band to save power consumption. Also, the band-select switch 90 controls the addition or subtraction at the receiver output in order to generate the desired signal and reject the image component.

While the Weaver architecture by itself does not provide sufficient image rejection, the 900-MHz spacing between the signal and the image allows substantial image filtering in the front-end duplexers.

Figure 5:
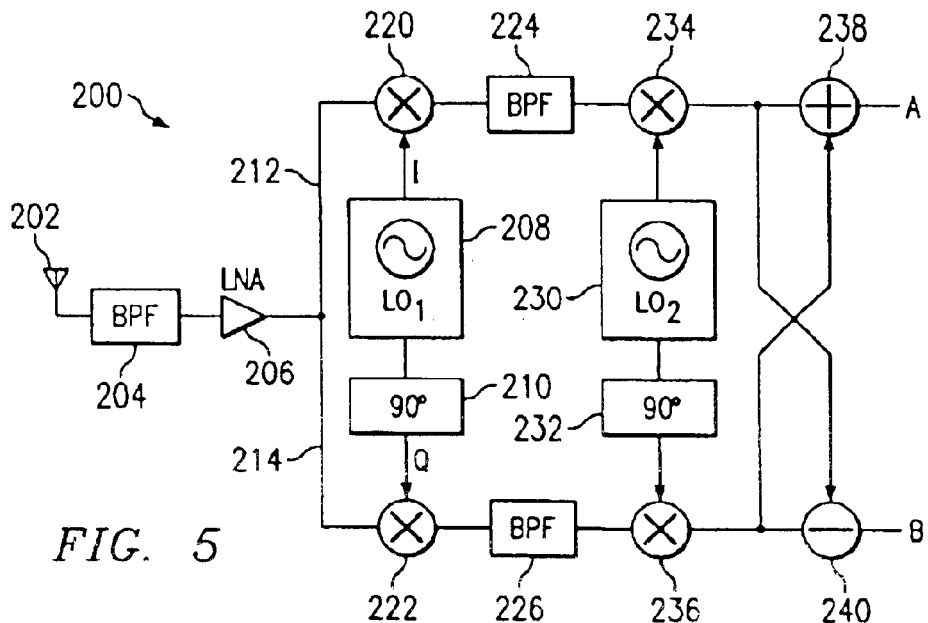
FIG. 5 is a schematic of one proposed implementation of a concurrent dual band receiver, using the "Weaver" image-rejection technique for the downconverter stage.

Applying the Weaver architecture in the way Wu and Razavi did for a concurrent dual-band receiver, however, is not a satisfactory solution. This will be best understood with reference to the exemplary configuration shown in FIG. 5. In particular, a dual-band antenna 202, selectively and simultaneously receives a signal in two frequency bands. The dual-band signal is filtered by a dual-band bandpass filter (BPF) 204 and simultaneously amplified and impedance matched at both frequencies by a concurrent dual-band LNA 206. A quadrature downconverter stage splits the received signal down two parallel paths 212 and 214, respectively. In path 212, the received signal is mixed with a reference signal from a first local oscillator ($LO_1$) 208 at mixer 220 to produce the in-phase (I) component of the received signal. Following Wu and Razavi, the frequency of $LO_1$, or $\omega_{LO1}$, is set half way between the center frequencies of the two desired bands of the system. Along path 214, the received signal is mixed with the reference at mixer 222, wherein the reference signal from $LO_1$ 208 is phase shifted by ninety degrees at phase shifter 210, producing the quadrature (Q) component of the received signal. The in-phase component (I) and the quadrature component (Q) are then further amplified and filtered at blocks 224 and 226, respectively, and are mixed in a second stage at mixers 234 and 236, respectively, with an in-phase $LO_2$ signal fed from oscillator block 230 and a quadrature $LO_2$ signal fed from the oscillator block, respectively. The two paths are then combined in a way to produce constructive interference on the signal of interest to produce signal A and destructive interference on the image signal.

In the concurrent downconversion scheme, however, since the unwanted image signal is one of the two desired signal bands, there is no attenuation of the image by any of the antenna, the front-end bandpass filter or the dual-band LNA. Thus, one must rely solely on the image rejection of Weaver's single sideband downconverter, which is limited by the phase and amplitude mismatch of the quadrature local oscillators and signal paths, and can only provide about 20–40 dB attenuation of the unwanted image in each band. This is clearly insufficient image rejection for the intermediate frequency signals and thus fails as a solution to the concurrent dual-band problem.

A solution is derived from analyzing the dual-band front-end subsystem's transfer function (at point "a" in FIGS. 4 and 6) shown in FIG. 7(a). As seen, the dual-band transfer function just prior to downconversion has two clearly distinct amplification (or desired frequency) bands, herein called bands "A" and "B", separated by a signal attenuation region. There are also attenuation regions below band A and above band B, for a total of three attenuation regions. These attenuation regions are completely determined by the compounded attenuation of the dual-band antenna, filter and LNA.

By offsetting the first local oscillator frequency $LO_1$ from the midpoint between bands A and B, as shown in the figure, applying the Weaver image rejection technique now not only does not suffer from the aforementioned drawbacks, but actually significantly improves the image rejection. The key to this solution is to offset the $LO_1$ frequency of the first stage of the image-rejection architecture from the midpoint of the two bands of interest in such a way that the image, $f_{IA}$, of the first band, $f_A$, falls at the middle attenuation region of the front-end subsystem transfer function. Similarly, the image of the second, upper desired band, $f_B$, falls at outside the pass-band of the front-end at $f_{IB}$ and will also be attenuated.

Figure 6:
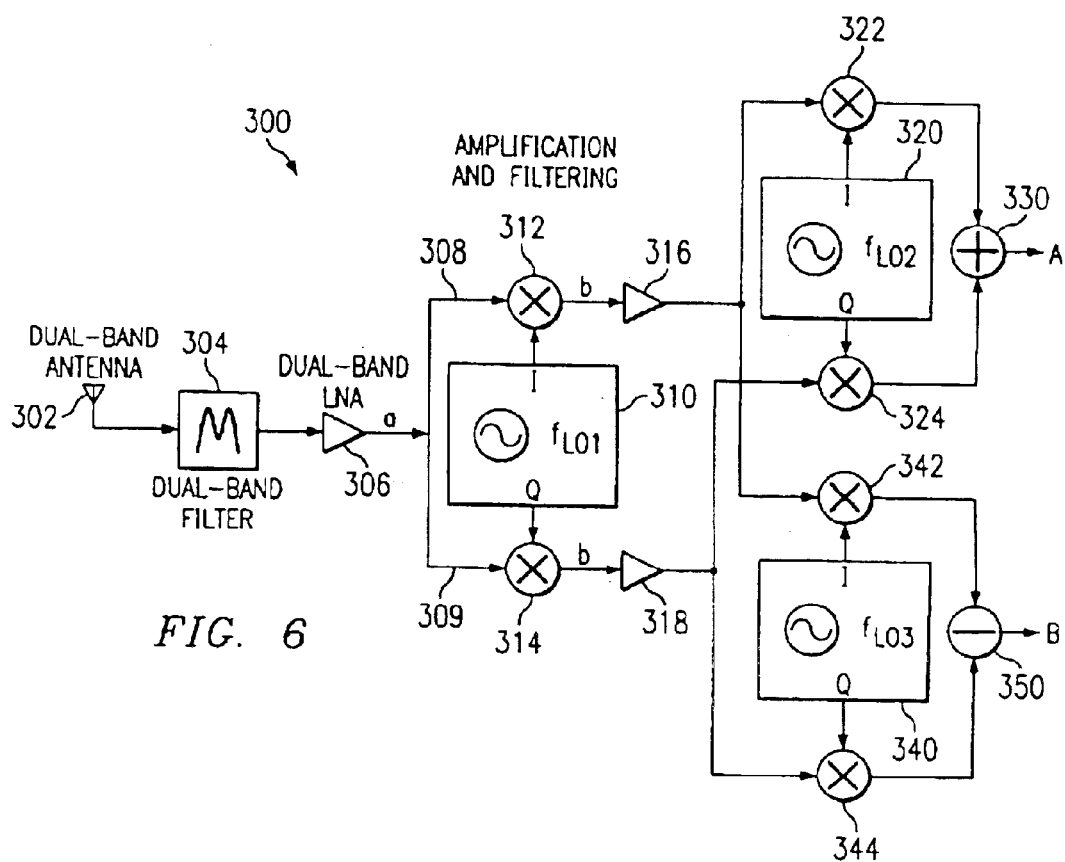
FIG. 6 is schematic showing one preferred embodiment of the concurrent dual-band receiver of the present invention, wherein the downconverter shown in FIG. 4 is a modified "Weaver" image-rejection circuit for concurrent dual-band downconversion.
Figure 7:
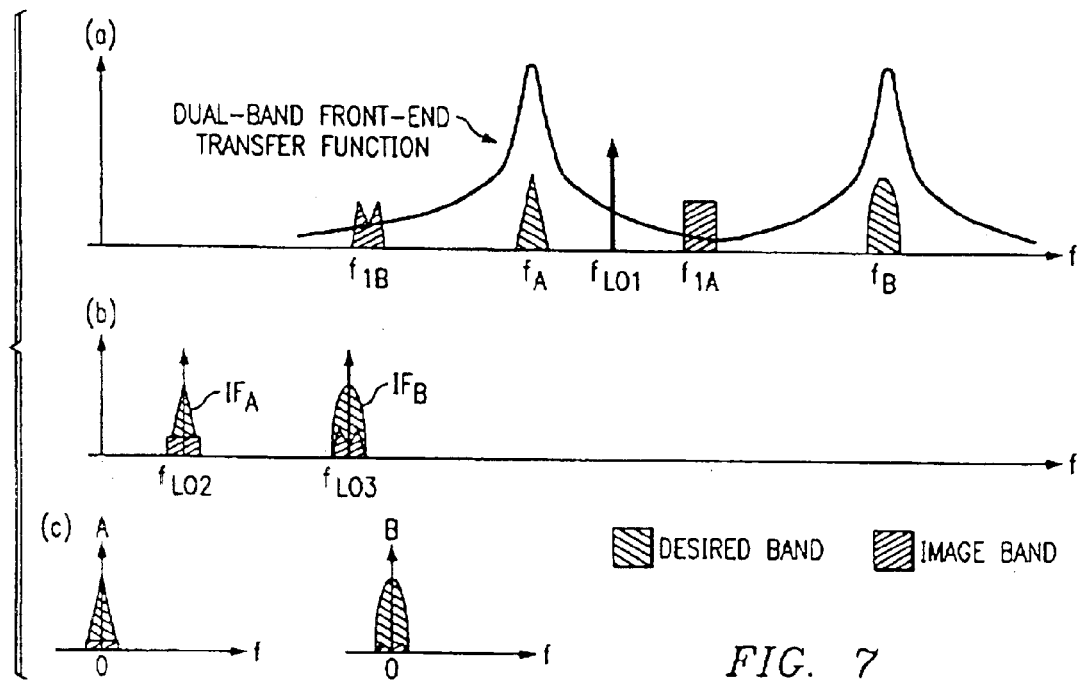
FIG. 7($a$) is a frequency domain graph showing frequency response of the concurrent, dual-band front-end with signals at the point just prior to the first downconversion stage in FIG. 6.

The inventive concurrent dual-band receiver architecture that implements this technique is shown in FIG. 6. The receiver 300 has a front-end subsystem having a dual-band antenna, dual band bandpass filter 304 and dual-band LNA 306 to provide the dual-band front end signal at "a" having the transfer function shown in FIG. 7(a). This signal is split into two paths. A first quadrature local oscillator block 310 having a predetermined frequency $f_{LO1}$ that satisfies this offset frequency requirement feeds a pair of mixers on the separate paths, just like the first half of any single-sideband image reject architecture, such as the Weaver architecture, and results in a pair of downconverted intermediate frequency (IF) signals, $IF_A$ and $IF_B$, as shown in FIG. 7(b), with relatively small image components superimposed on the two signals.

At least one subsequent downconversion stage is needed to further reject the remaining image signal and to take the signals down to baseband or near baseband. In the preferred embodiment shown in FIG. 6, only one additional stage is needed. Thus, $IF_A$ traveling on the upper path 308 and $IF_B$ traveling on the lower path 309 are passed through low pass filter/amplifier blocks 316 and 318, respectively, to eliminate the unwanted upconverted signals and to amplify the desired downconverted signals.

The two signals, herein called the in-phase intermediate frequency (IF) signal, $IF_I$, and quadrature intermediate frequency signal, $IF_Q$, are each split into two separate paths and are concurrently fed into the subsequent downconversion stage to produce baseband, or near baseband, signals, A and B. In the preferred embodiment shown in FIG. 6, a second quadrature local oscillator, $LO_2$, 320 having a frequency $f_{LO2}$ and third quadrature local oscillator, $LO_3$, 340 having a frequency $f_{LO3}$ are provided. Along the upper path, the in-phase $LO_2$ signal is mixed with $IF_I$ at mixer 322 and the quadrature $LO_2$ signal is mixed with $IF_Q$ at the second mixer 324. The resultant signals are then combined at summing circuit 330 to produce the first desired baseband signal, A, shown as the first graph of FIG. 7(c).

Along the lower path, the in-phase $LO_3$ signal is mixed with $IF_I$ at mixer 342 and the quadrature $LO_3$ signal is mixed with $IF_Q$ at a fourth mixer 344. These two resultant signals are then recombined at summing circuit 350 to produce the second desired baseband signal, B, shown as the second graph of FIG. 7(c).

It will be understood by those skilled in the art that the final downconversion signal need not be at baseband. The signal could alternatively be downconverted to any appropriate frequency (i.e. near baseband) that is capable of being further processed by subsequent stages.

Figure 8:
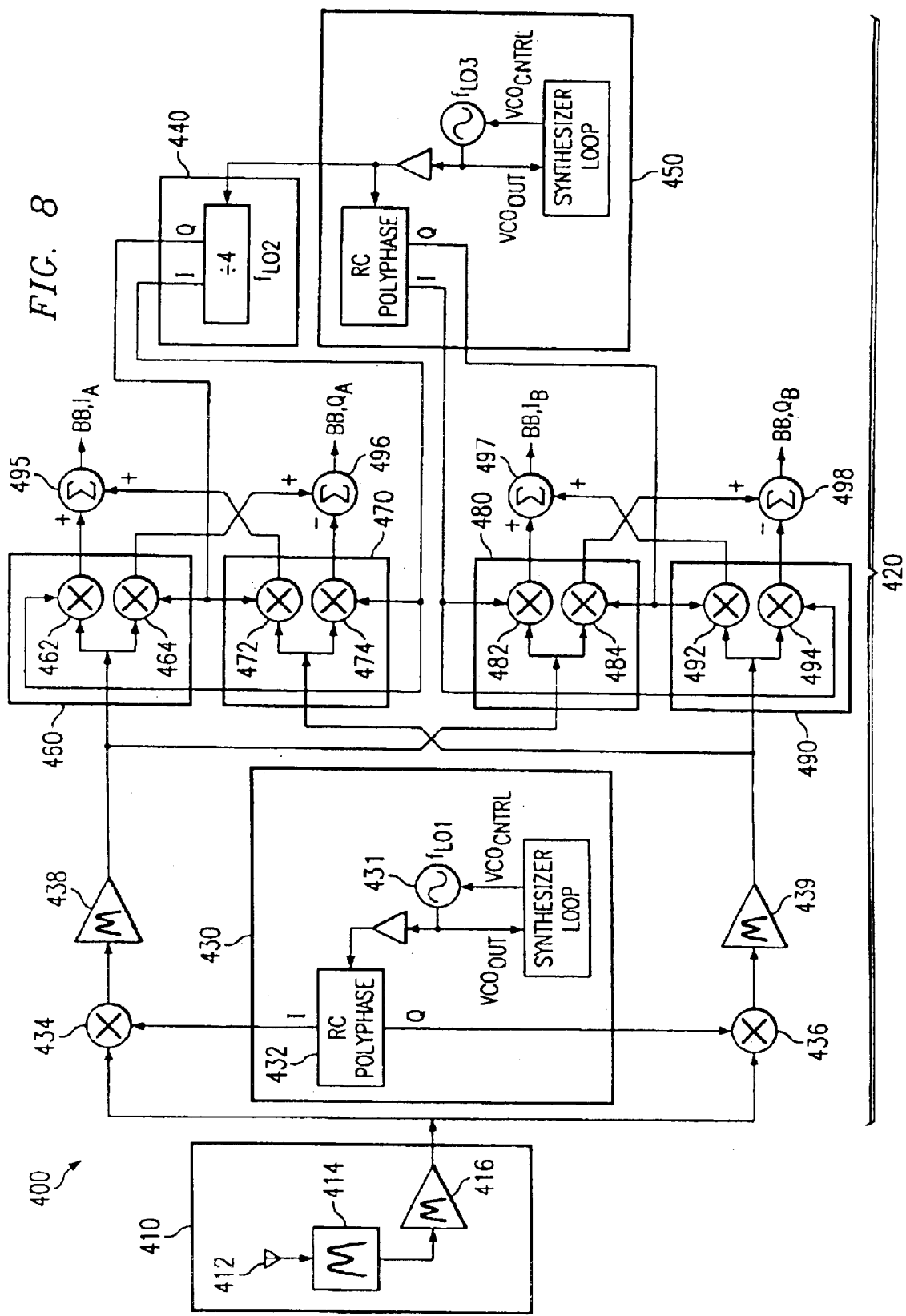
FIG. 8 is a schematic showing a specific implementation of a concurrent dual band 2.45 GHz/5.80 GHz receiver designed according to the present invention.

Note that in practical implementations, three separate frequency synthesizers to generate the three mentioned local oscillators are not needed. Since two channels (in two bands) are independently selected, only two frequency synthesizers are needed. A third local oscillator can be generated from (one of) those. For example, the second local oscillator 440 shown in FIG. 8 is generated by dividing the outpout frequency of synthesizer 450 by 4.

It should be understood that variations to the circuit shown in FIG. 6 are within the scope of the present invention. For example, as illustrated in the specific concurrent dual-band receiver design circuit shown in FIG. 8, each mixer in the second downconversion stage may alternatively comprise a mixing stage that includes more than one mixer.

3. A Concurrent 2.45 GHz/5.80 GHz Receiver

Figure 9:
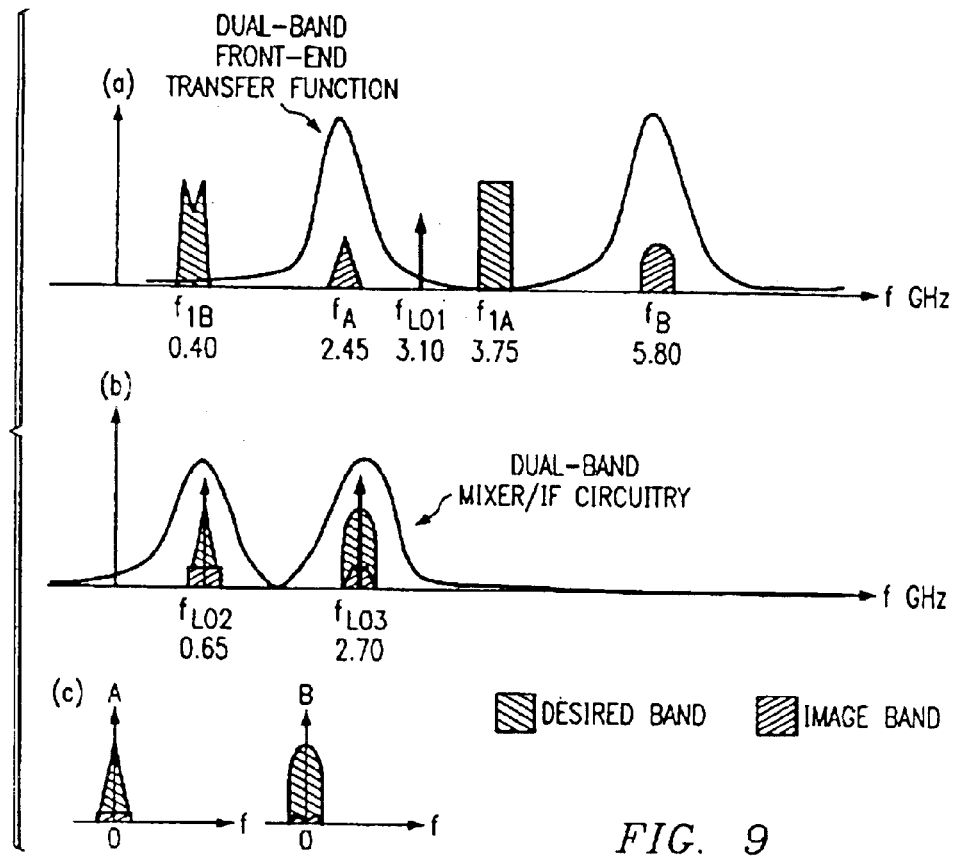
FIGS. 9($a$)–($c$) are graphs of the transfer functions of the receiver building blocks and frequency domain representation of the signals received by the receiver shown in FIG. 8.

The architecture of the present invention has been implemented in the design of a concurrent dual-band receiver that simultaneously receives and downconverts signals in the 2.45 GHz band and 5.80 GHz band. The circuit block diagram for this design is shown in FIG. 8 and its conceptual transfer functions at the front-end, intermediate frequencies and outputs with frequency planning details are shown in the graphs of FIGS. 9(a)–9(c). In particular, the receiver 400 includes a dual-band front-end subsystem 410 having a front-end transfer function shown in FIG. 9(a), and a dual-band, single-sideband image rejection downconverter 420 designed according to the present invention. The front-end subsystem includes a dual-band antenna 412, dual-band filter 414 and dual band LNA 416, each tuned to pass signals in the 2.45 GHz ($f_A$) and 5.80 GHz ($f_B$) bands.

The front-end signal is split into an upper and lower path. The upper path is mixed at mixer 434 with an in-phase local oscillator signal produced by a first local oscillator circuit (freguendy synthesizer loop) 430 having a local oscillator $LO_1$ 431 and an RC polyphase circuit 432. This circuit produces an in-phase intermediate frequency signal, called $IF_I$. The lower path is mixed at mixer 436 with the quadrature LO$_1$ signal produced by LO$_1$ 431 and polyphase circuit 432 and produces a quadrature intermediate frequency signal, called IF$_Q$. As seen in FIG. 9(a), the frequency of the first local oscillator LO$_1$ 430 is strategically set at 3.10 GHz, so that when mixed with received dual-band signal, the image of f$_A$, or f$_{IA}$, will be at 3.75 GHz, which as seen in FIG. 9(a) is advantageously at an attentuation region of the front end transfer function. Similarly, the image of the second band, f$_{IB}$, is at 0.40 GHz, which is also at an attentuation region of the front-end transfer function.

IF$_I$ and IF$_Q$ are then further filtered and amplified at 438 and 439, respectively, with an IF transfer function as shown in FIG. 9(b). The downconverter now processes the two paths in the second, and in this preferred embodiment, final, downconversion stage as follows.

A second quadrature local oscillator (LO$_2$) block 440 is to produce an in-phase (I) signal (f$_{LO2I}$) and a quadrature (Q) signal (f$_{LO2Q}$) at a second given frequency. In the present embodiment, as shown in FIG. 9(b), this frequency is 0.65 GHz, the same as the frequency of IF$_A$ signal. A third quadrature local oscillator (LO$_3$) block is also provided to produce an in-phase (I) signal (f$_{LO3I}$) and a quadrature (Q) signal (f$_{LO3Q}$) at a third given frequency. This frequency is set at 2.70 GHz. Since in the preferred embodiment, f$_{LO2}$ is one fourth f$_{LO3}$, block 440 is shown as a "divide-by-four" circuit, hence there will be no need for more than two frequency synthesizers.

Following the architecture described in conjunction with FIG. 6, the second downconversion stage also includes four intermediate frequency (IF) mixing stages. In particular, a first IF mixing stage 460 mixes the filtered and amplified upper path IF$_I$ signal with the in-phase signal, f$_{LO2I}$, of the LO$_2$ block at a first mixer 462 and supplies a resultant first low frequency (LF$_1$) signal. A second IF mixing stage 470 mixes f$_{LO2Q}$ with the lower path IF$_Q$ signal at mixer 472 and supplies a resultant second low frequency signal (LF$_2$). LF$_1$ and LF$_2$ are summed at summing circuit 495 to produce the first in-phase baseband signal, denoted as BB,I$_A$.

A third IF mixing stage 480 mixes f$_{LO3I}$ with the IF$_I$ at a third mixer 482 and supplies a resultant third low frequency signal LF$_3$, and a fourth IF mixing stage 490 mixes f$_{LO3Q}$ with the lower path IF$_Q$ signal and to supply a resultant fourth low frequency signal, LF$_4$. LF$_3$ and LF$_4$ are summed at summing circuit 497 to produce the second desired in-phase baseband signal, denoted as BB,I$_B$. In the prefered embodiment, these signals are at baseband, but need not be.

However, in the preferred embodiment shown in FIG. 8, each of the four IF mixing stages includes an additional mixer to mix the various combinations of in-phase and quadrature signals. By properly combining (add/subtract) these mixed signals, not only are quadrature signals at baseband provided, but improved image rejection is also achieved. As disclosed by Crols and Steyaert in "A Single-Chip 900 MHz CMOS Receiver Front-End With A High Performance Low-IF Topology," IEEE Journal of Solid-State Circuits, Vol. 30, No. 12, December 1995, this technique is known in the art as double quadrature downconversion. In particular, mixing stage 460 includes a fifth mixer 464 that mixes f.sub.LO2Q with IF.sub.I and mixing stage 470 includes a sixth mixer 474 that mixes f.sub.LO2I with IF.sub.Q. The outputs of these mixers 464 and 474 are combined at summing circuit 496 to produce a first quadrature baseband signal, denoted as BB,Q.sub.A. Moreover, mixing stage 480 includes a seventh mixer 484 that mixes f.sub.LO3Q with IF.sub.1 and mixing stage 490 includes an eighth mixer 494 that mixes f.sub.LO3I with IF.sub.Q. The outputs of these mixers, 484 and 494 are combined at summing circuit 498 to produce a second quadrature baseband signal, denoted as BB,Q.sub.B.

4. Description of a Concurrent Dual-band Low Noise Amplifier

Traditional single-band LNA's use a single or cascode transistor stage to provide wide-band transconductance and combine it with proper passive resonant circuitry at the input and output to shape the frequency response and achieve gain and matching at the single band of interest. See e.g., Shaffer et al., "A 1.5-V, 1.5 GHz CMOS Low Noise Amplifier," IEEE JSSC, vol. 32, No. 5, pp. 745–59, May 1977. The inventors have observed that the wide-band transconductance of the active device can be used to provide gain and matching at other frequencies of interest without any penalty in power dissipation. This observation has led the inventors to the concurrent dual-band LNA of the present invention that provides simultaneous gain and matching at two bands.

The following provides a generic approach to the design of a general class of integrated, single path concurrent multi-band LNA's as one of the essential building blocks of concurrent multi-band receivers. In a single-band LNA, passive circuits are used to shape the wideband transconductance of the active device in the frequency domain to achieve gain and matching at the frequency of interest. This concept can be generalized to multiple frequency bands noting that the intrinsic transconductance of the active device is inherently wideband and can be used at multiple frequencies simultaneously.

Figure 10:
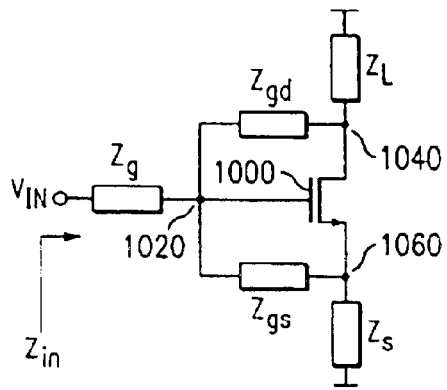
FIG. 10 is a general model for a single transistor amplifier with arbitrary impedances connected to the terminals.

FIG. 10 shows the general case impedance model of a three terminal active device having an input terminal, an output terminal and a current source terminal. The active device shown here is an NFET transistor having a gate 1020, g, as its input terminal, a drain 1040, d, as its output terminal, and a source 1060, s, as its current source terminal. The transistor and impedance terminology and symbology used hereinafter follow the FET transistor convention. However, it should be understood that this general case and the specific examples set forth hereinafter apply equally to other types of three terminal active devices, such as bipolar, MESFET, PHEMT transistors, etc.

Figure 11:
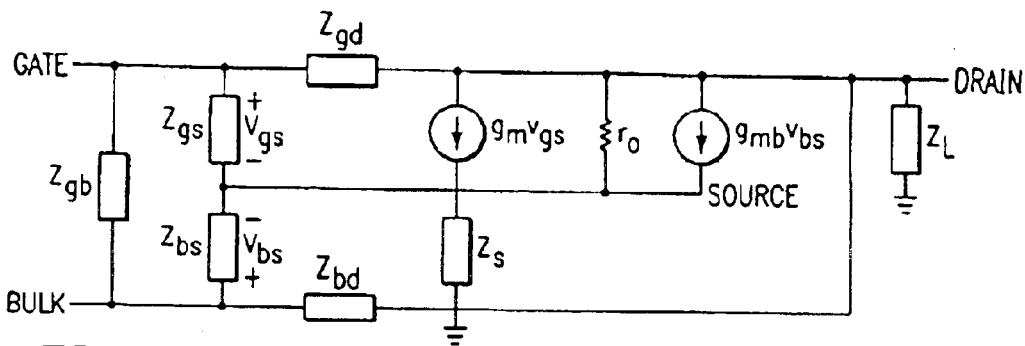
FIG. 11 is an equivalent small-signal model of the transistor amplifier shown in FIG. 10, with the transistor shown as a combination of impedance and voltage dependent current sources.
Figure 12:
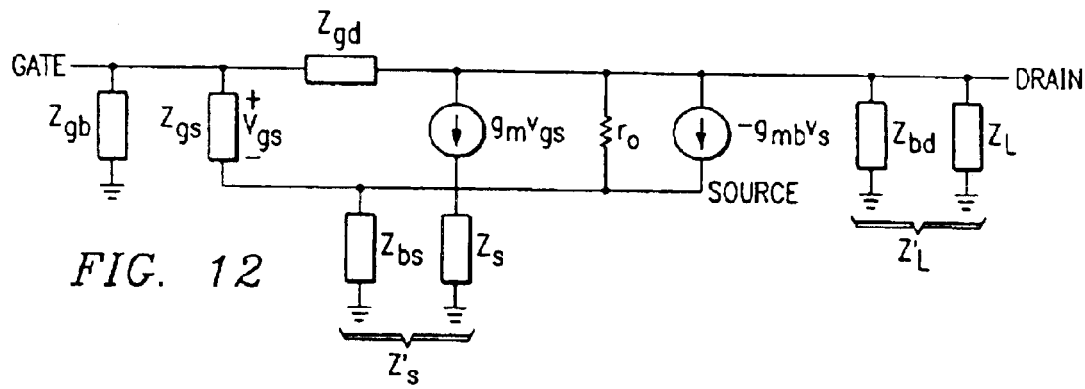
FIG. 12 is a simplified schematic of FIG. 11 with the active device (transistor) disposed on an ac-grounded bulk substrate.

This general model shows an LNA input signal, V$_{in}$, with an arbitrary series impedance between the incoming input signal and the gate, Z$_g$, a gate-source impedance, Z$_{gs}$, a source impedance Z$_s$, a gate-drain impedance Z$_{gd}$, (also known as the feedback impedance Z$_f$) and a load impedance Z$_L$. The impedances shown in FIG. 10 also include transistor's inherent reactance components (e.g., C$_{gs}$). This model is redrawn in FIG. 11 with the transistor shown as a combination of current sources and a drain-to-source resistance, r$_o$, and disposed on silicon substrate bulk, b, with the added impedances introduced from each transistor terminal to the bulk, namely, Z$_{gb}$, Z$_{bs}$, and Z$_{bd}$. FIG. 12 is the same as FIG. 11 but with the bulk set to AC ground. As noticed in FIG. 12, the bulk-to-source impedance, Z$_{bs}$, can be combined with the source impedance Z$_s$ to result in Z'$_s$. Further, the bulk-to-drain impedance, Z$_{bd}$, can be combined with the externally added load impedance Z$_L$ resulting in Z'$_L$.

The three primary design considerations for a concurrent dual-band LNA of the present invention are (1) input impedance matching; (2) noise factor minimization; and (3) output gain. Each of these are now considered in detail.

A. Multiband Input Impedance Matching

An important feature of an LNA is its input impedance matching for maximum power transfer. Neglecting r$_0$ shown in FIG. 12, the input admittance (inverse of impedance) looking into the gate of the transistor, has been derived by the inventors and is given by the equation:

$$Y_{in} = \frac{1}{Z_g + Z_{gs} + Z'_s(1 + g_m Z_{gs})} + \frac{1}{Z'_L + Z_f} + \quad \text{Eq. (1)}$$

$$\frac{g_{mb}}{1 + \frac{Z_f}{Z'_L}} + \frac{1}{1 + \frac{Z_f}{Z'_L}} \times (g_m - g_{mb}) \times \frac{Z_{gs}}{Z_{gs} + Z'_s(1 + g_m Z_{gs})}$$

Figure 13:
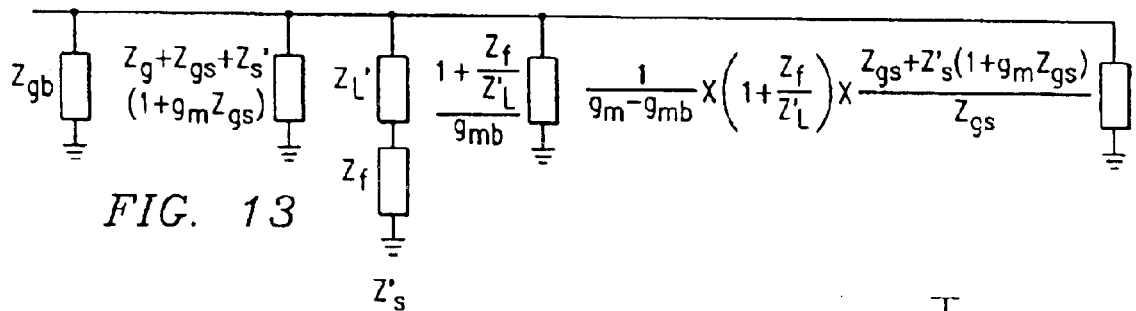
FIG. 13 is an input impedance network system schematic of the present invention showing the input impedances of the amplifier looking into the gate of the transistor.

For purposes of impedance matching, the inventors have designed the broad schematic shown in FIG. 13 showing the input impedance of the LNA looking into the gate of the transistor. Converting FIG. 13 to an equation, the input impedance can be defined as the sum of five, two-terminal, frequency-dependent, impedance networks:

$$Z_{in} = Z_1 + Z_2 + Z_3 + Z_4 + Z_5 \quad \text{Eq. (2)}$$

wherein
$Z_1 = Z_g + Z_{gs} + Z'_s + g_m Z'_s Z_{gs}$;
$Z_2 = Z'_L + Z_f$;
$Z_3 = [1 + Z_f/Z'_L]/g_{mb}$, wherein $g_{mb}$ is the bulk effect transconductance;

$$Z_4 = \frac{1}{g_m - g_{mb}} \cdot \left(\frac{Z_f}{Z'_L}\right) \cdot \frac{Z_{gs} + Z'_s(1 + g_m Z_{gs})}{Z_{gs}}; \text{ and}$$

$Z_5$ is the intrinsic gate-to-bulk impedance, $Z_{gb}$.

Further, neglecting the effect of the gate-to-drain impedance $Z_{gd}$ ($Z_f$), that is to say, assuming the transistor's internal reactance $C_{gd}$ approximates 0 (compared to the other impedances in the network), as well as $Z_{gb}$, the input impedance of the amplifier shown in FIGS. 4–8 is simplified to $$Z_{in} = Z_1 = Z_g + Z_{gs} + Z'_s(1 + g_m Z_{gs}) \quad \text{Eq. (3)}$$

To achieve a maximum input power match at more than one frequency band simultaneously, the inventors have determined that Equation 3 should satisfy the following equation set:

$$Z_g + Z_{gs} + Z'_s = 0 \quad \text{Eq. (4)}$$

and thus, $$g_m Z'_s Z_{gs} = Z_{in} = R_{in} = 50\Omega, \quad \text{Eq. (5)}$$

wherein $R_{in} = 50\Omega$ is the predetermined characteristic impedance of the antenna. It should be understood that any other antenna design having a different impedance value could be used. However, as is well understood, 50Ω has become a de facto standard in antenna receiver design.

To demonstrate the validity of these expressions, consider the special case of a single band LNA inductive source degeneration similar to that of Shaffer et al., discussed above, where (4) reduces to:

$$\begin{cases} (L_g + L_s) C_{gs} \omega^2 = 1 \\ \frac{g_m L_s}{C_{gs}} = R_{in} = 50\Omega \end{cases}$$

in accordance with Shaffer et al.

The general design criteria given by Eq. (4) can be used to generate a large number of different topologies for concurrent multi-band LNAs. The section titled "Examples" below presents just two examples of such topologies, one for a dual-band LNA and another for a triple-band LNA.

B. Noise Factor

Ignoring the noise contribution of passive elements, the total noise of an LNA can be represented by its input equivalent voltage and current noise:

$$i_n = \frac{i_{nd}}{g_m Z_{gs}} + i_{ng} \quad \text{Eq. (6)}$$

$$e_n = \frac{Z_{gs} + Z'_s + Z_g}{g_m Z_{gs}} \cdot i_{nd} + (Z'_s + Z_g) \cdot i_{ng}$$

where $i_{nd}$ and $i_{ng}$ are the drain and gate noise currents (collector and base noise currents in a bipolar implementation), and $g_m$ is the transconductance of the transistor.

To obtain more insight into the design trade-offs, the inventors of the present invention ignored the gate noise (that usually contributes less than 0.2 dB to the NF), in the expression for the noise factor, F, that is given by:

$$F = 1 + \frac{\overline{|i_n + Y_s e_n|^2}}{\overline{i_s^2}} \quad \text{Eq. (7)}$$

$$\approx 1 + \frac{\gamma g_{d0}}{Y_s} \cdot \frac{1}{g_m^2 |Z_{gs}|^2} \cdot |1 + Y_s(Z_{gs} + Z_s + Z_g)|^2$$

where $g_{d0}$ is the zero-bias drain-source channel conductance, $Y_s$ is the reference source admittance (e.g., $Y_s = 1/50\Omega$) for the noise figure, NF, $i_s$ is the noise current associated with this source admittance, and γ is the excess noise factor for the MOS transistor ranging from ⅔ for long-channel devices to more than 2 for short-channel devices.

Several useful design implications can be obtained from Eq. (7). First of all, this equation agrees with the well-accepted notion that NF can be reduced using a larger $g_m$ (more power dissipation). It also shows that an increase in $Z_{gs}$ improves the NF, that accounts for the improvement in noise figure for transistors with smaller channel length and $C_{gs}$. The last term in Eq. (7) plays the most important role in the design of concurrent multi-band LNA's. Since passive components cannot produce any negative real part, the last term reaches its minimum when $Z_g + Z_{gs} + Z'_s = 0$ at the frequency(ies) of interest. Thus, the minimum NF will be achieved for these frequency(ies).

It is thus observed that in order to achieve both minimal noise and maximum power match at the input for multiple frequencies, equations (3) and (7) should simultaneously satisfy the minimum NF and input matching condition at all frequencies of interest. Interestingly, equations (4) and (5) do just that. In addition to these conditions, it is crucial to maximize $Z_{gs}$ and $g_m$ to minimize NF as much as the power budget allows.

C. Narrow Band Output Gain

In order to achieve narrow-band gain at the bands of interest, the drain load network should exhibit high impedance only at those frequencies of interest. Using the model of FIGS. 10–13, the overall gate to drain voltage gain, Av, (neglecting the body effect and $r_0$) is given by the equation:

$$A_V = \frac{Z_L Z_f}{Z_L + Z_f} \cdot \left[\frac{1}{Z_f} - \frac{g_m Z_{gs}}{Z_{gs} + Z'_s(1 + g_m Z_{gs})}\right] \quad \text{Eq. (8)}$$

Again neglecting the feedback impedance $Z_f$ (i.e. $Z_f \approx \infty$) we obtain:

$$A_V = Z'_L \cdot \left[ -\frac{g_m Z_{gs}}{Z_{gs} + Z'_s + g_m Z'_s Z_{gs}} \right] \quad \text{Eq. (9)}$$

Applying the parameters of Eq. (4), the voltage gain equation simplifies even further to $$A_v = -Z'_L/Z'_s \quad \text{Eq. (10)}$$

As discussed below, several resonant circuits satisfy this equation for maximum voltage gain.

5. A Concurrent Dual-band CMOS LNA Topology Example

Figure 14:
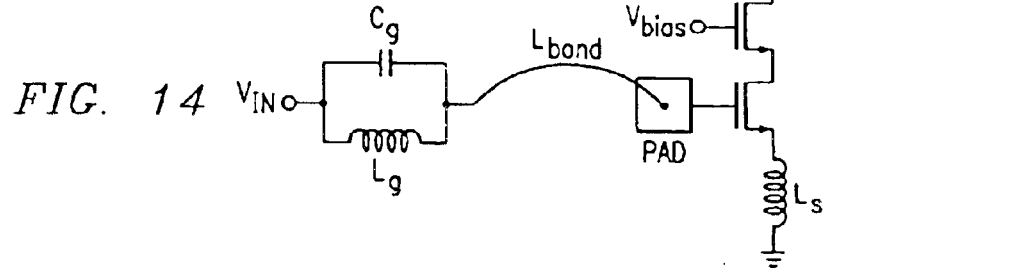
FIG. 14 is a schematic of a concurrent dual band CMOS LNA.

A large number of passive networks satisfy the design criteria of Equations 4, 5 and 10. In order to minimize the NF, one should maximize $Z_{gs}$, as previously mentioned. One way to obtain a reasonably large $Z_{gs}$, is to use a transistor with minimum channel length and no extra passive element between the gate and the source. Equation 5 can be satisfied using a single on-chip source degenerative inductor. FIG. 14 shows a concurrent dual-band CMOS LNA designed according to the criteria set forth above (with biasing not shown). In other to fulfill Equation 4 at both center frequencies, as shown, a parallel LC network in series with the inevitable inductance of the bonding wire and package lead is used. The parallel LC of $Z_g$ resonates with $Z_{gs}+Z_s$ at both frequency bands of interest such that Equation 4 is satisfied.

In order to achieve narrow-band gain at bands of interest, the drain load network should exhibit high impedance only at those frequencies. This can be done by adding a series LC branch in parallel with the parallel LC tank of a single-band LNA, as shown off the drain of the cascode transistor in FIG. 14. Each series LC branch introduces a zero in the gain transfer function of the LNA at its series resonant frequency.

It should be understood that this is but one topology that satisfies the above-derived equations for the design of a concurrent multi-band LNA. Many other topologies can be used.

(i) Concurrent Dual-band LNA Measurement Results

A concurrent dual-band CMOS LNA operating at 2.45 GHz and 5.25 GHz frequency bands for indoor wireless communications was designed based on the topology of FIG. 14. This section presents the measurement results. It was implemented in a 0.35 μm BiCMOS technology using only CMOS transistors. The input parallel resonator uses Cg=0.9 pF porcelain multilayer capacitor and Lg=2.7 nH chip inductor. The inductance of the bonding wire, Lbond=3 nH and the source inductor, Ls=0.7 nH. Turning to the load network, the high impedance at each of the two frequencies is obtained by providing the series LC branch, C1=240 fF and L1=9.8 nH and the parallel LC tank, L2=2.3 nH and the inherent parasitic capacitance of the transistor, which is equivalent of to approximately 300 F.

Figure 15:
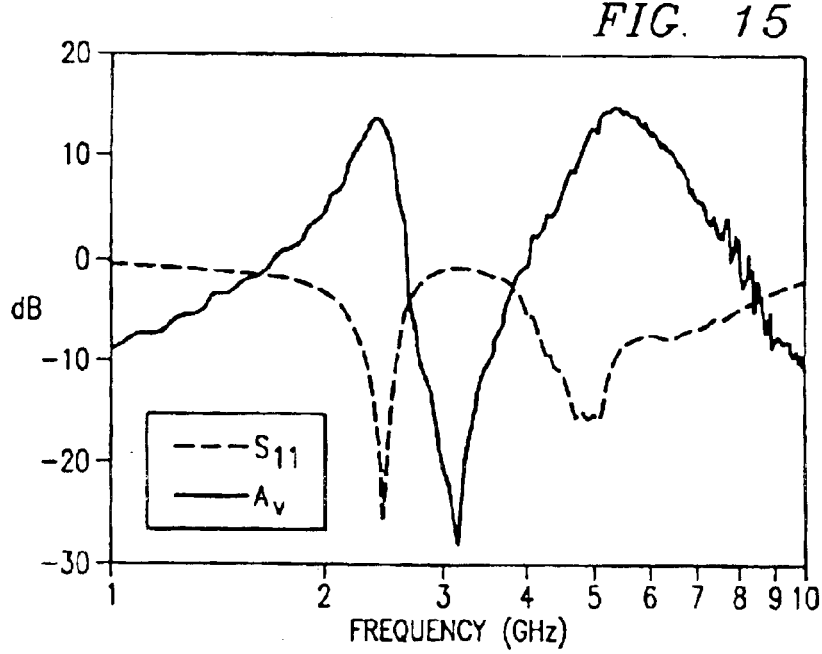
FIG. 15 is a graph showing the measured voltage gain and $S_{11}$ of the dual-band LNA shown in FIG. 14.

FIG. 15 shows the measured voltage gain, $A_v$, and input reflection coefficient, $S_{11}$, of the amplifier up to 10 GHz. It achieves narrow-band voltage gains of 14 dB and 15.5 dB, input return losses of 25 dB and 15 dB, and noise figures of 2.3 dB and 4.5 dB at 2.45 GHz and 5.25 GHz, respectively. It drains 4 mA of current from a 2.5V supply voltage. The notch due to the LNA is about 40 dB deeper than the peaks which directly translated to the same amount of improvement in image rejection. Due to the large difference between the notch and pass-band frequencies, no elaborate tracking loops such as those proposed by Samavati et al. in "A 5-GHz CMOS Wireless LAN Receiver Front End" *IEEE JSSC*, vol. 35, no. 5, pp. 765–72, May, 2000, are necessary. The single-ended nature of the LNA makes external Baluns unnecessary. Measurements of 6 different chips with 3 different boards and off-chip components showed strong repeatability without using the commonly-used sliding capacitor input matching adjustment.

Figure 16:
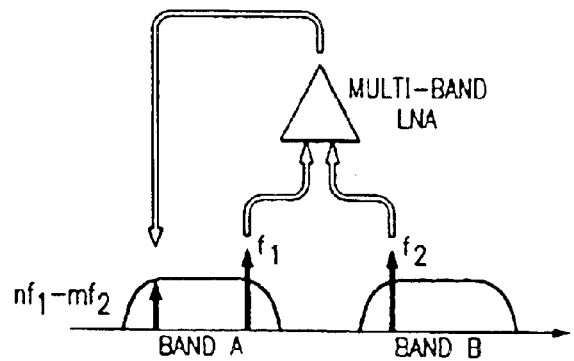
FIG. 16 is an illustration of the crossband intermodulation of a dual band LNA.

An LNA's linearity is often measured by intermodulation and compression point tests and represented by IP3, for 3rd order non-linearity, and CP1 for 1 dB compression point. We refer to these in-band IP3 and CP1, as $IP3_{inband}$ and $CP1_{inband}$. However, in a multi-band system, more non-linearity measures should be considered. In-band signals from different desired bands (e.g., 2.50 GHz and 5.15 GHz) can mix due to amplifier's non-linearity, causing in-band undesired signals (e.g., 3×2.50−1×5.15=2.35 due to 4th order non-linearity), as shown in FIG. 16. The inventors showed this cross-band IPn, as $IPn_{crossband}$, where n is the order of non-linearity. A similar cross-band compression measure can be defined as the signal power in band A that causes a 1 dB drop in the small signal gain in band B and vice versa, which will be denoted as $CP1_{A>B}$.

This concurrent dual-band LNA demonstrates an input-referred in-band IP3 of 0 dBm and 5.6 dBm, and in-band CP1 of −8.5 dBm and −1.5 dBm at 2.45 GHz and 5.25 GHz bands, respectively. The measured input referred $IP4_{crossband}$ is 7.5 dBm. The LNA exhibits an $CP1_{2.4>5.2}$ of −11.5 dBm and an $CP1_{5.2>2.4}$ of −5.7 dBm.

Figure 17:
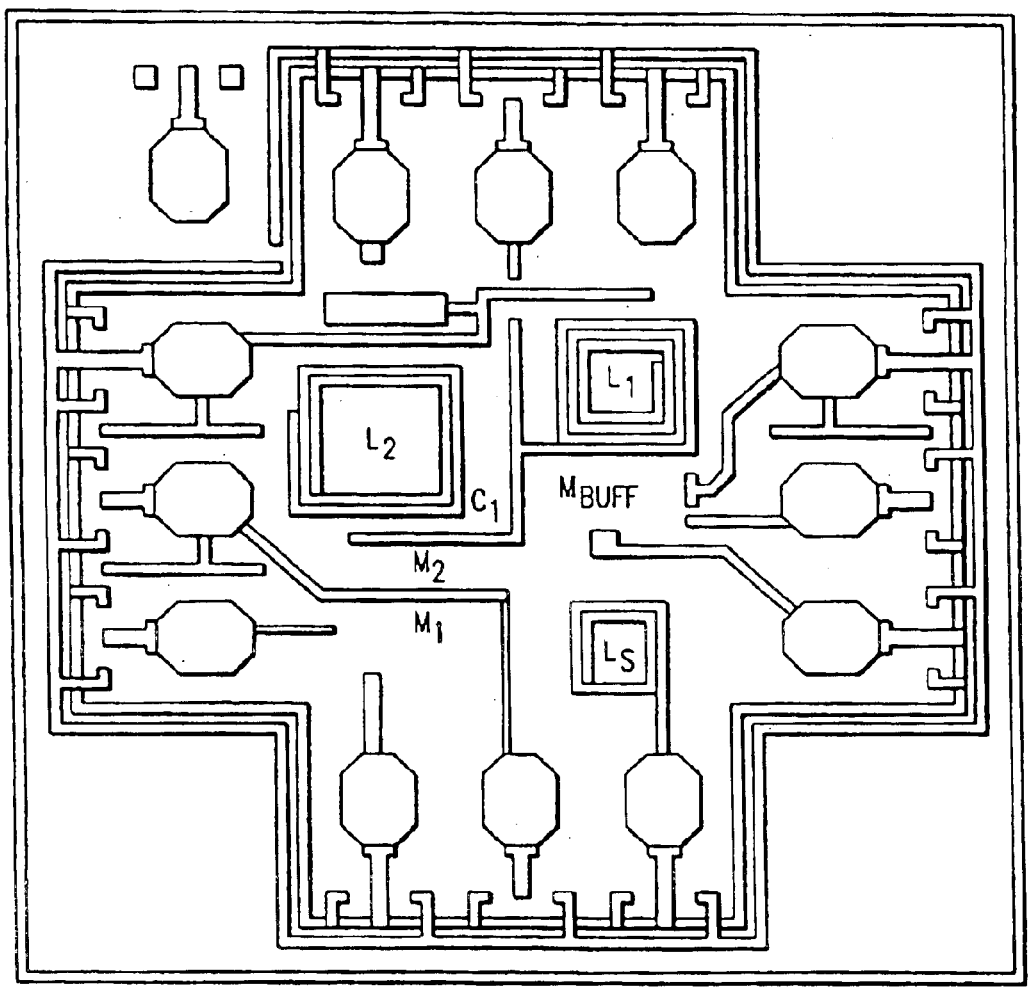
FIG. 17 is a micrograph of a concurrent dual band LNA.

The following table summarizes the measured performance of the fabricated monolithic concurrent dual-band LNA shown in FIG. 17. The chip occupies an area of 0.8×0.8 mm² including pads and ESDs. The NF, $S_{11}$ and power dissipation are better than previously published non-concurrent and/or single-band CMOS LNAs.

| Frequency | 2.45 GHz ± 50 MHz | 5.25 GHz ± 100 MHz |
|---|---|---|
| Voltage Gain | 14 dB | 15.5 dB |
| $S_{11}$ | −25 dB | −15 dB |
| NF | 2.3 dB | 4.5 dB |
| Input IP3$_{in-band}$ | 0.0 dBm | 5.6 dBm |
| Input CP1$_{in-band}$ | −8.5 dBm | −1.5 dBm |
| Input CP1$_{A>B}$ | $CP1_{2.4>5.2}$ = −11.5 dBm | $CP1_{5.2>2.4}$ = −5.7 dBm |
| Input IP4$_{cross\ band}$ | 7.5 dBm | |
| DC Current | 4 mA | |
| Supply Voltage | 2.5 V | |
| Active Device | 0.35 μm CMOS transistors | |

The present invention provide a generic approach to the design of a general class of concurrent dual-band receivers. Having thus described exemplary embodiments of the invention, it will be apparent that further alterations, modifications, and improvements will also occur to those skilled in the art. Further, it will be apparent that the present technique and system is not limited to any particular pair of frequency bands of interest or specific implementation.

We claim:

1. A concurrent, dual-band, image-rejection downconverter for a concurrent dual-band RF receiver having a front-end subsystem that supplies a front-end signal having two discrete desired frequency bands and a transfer function with attenuation regions at frequency bands outside the two discrete desired frequency bands, comprising:

(a) a first image-rejection downconversion stage that receives and that is adapted to simultaneously downconvert the front-end signal to two intermediate frequency (IF) bands such that the image frequency bands of the two desired frequency bands fall at the attenuation regions of the front-end transfer function, and further comprising:

(i) a first quadrature local oscillator (LO$_1$) block adapted to supply an in-phase (I) signal and a quadrature (Q signal of a first predetermined frequency;

(ii) a first mixer connected to the LO$_1$ block and the front-end subsystem that is adapted to mix the in-phase LO$_1$ signal with the front-end signal and to supply a resultant in-phase intermediate frequency (IF) signal; and (iii) a second mixer connected to the LO$_1$ block and the front-end subsystem and adapted to mix the quadrature LO$_1$ signal with the front-end signal and to supply a resultant quadrature IF signal, wherein the first predetermined frequency of the LO$_1$ block is offset from the midpoint of the two desired bands such that the image frequency bands of the two desired bands fall at attenuation regions of the front-end transfer function; and (b) a subsequent image-rejection downconversion stage that downconverts the two IF bands.

2. The downconverter of claim 1, further including an in-phase IF filtering and amplification stage connected to the first mixer and a quadrature IF filtering and amplification stage connected to the second mixer.

3. A concurrent, dual-band, image-rejection downconverter for a concurrent dual-band RE receiver having a front-end subsystem that supplies a front-end signal having two discrete desired frequency bands and a transfer function with attenuation regions at frequency bands outside the two discrete desired frequency bands, comprising:

(a) a first image-rejection downconversion stage that receives and that is adapted to simultaneously downconvert the front-end signal to two intermediate frequency (IF) bands such that the image frequency bands of the two desired frequency bands fall at the attenuation regions of the front-end transfer function; and (b) a subsequent image-rejection downconversion stage that downconverts the two IF bands, further comprising:

(i) a second quadrature local oscillator (LO$_2$) block adapted produce an in-phase (1) signal and a quadrature (Q) signal at a second given frequency;

(ii) a first intermediate frequency (IF) mixing stage connected to the LO$_2$ block and the first mixer that is adapted to mix the in-phase intermediate frequency (IF) signal with the in-phase signal of the LO$_2$ block and to supply a resultant first low frequency (LF) signal;

(iii) a second IF mixing stage connected to the LO$_2$ block and the second mixer that is adapted to mix the quadrature signal of the LO$_2$ block with the quadrature IF signal and to supply a resultant second LF signal;

(iv) a third quadrature local oscillator (LO$_3$) block adapted produce an in-phase (I) signal and a quadrature (Q) signal at a third given frequency;

(v) a third IF mixing stage connected to the LO$_3$ block and the first mixer that is adapted to mix the in-phase LO3 signal with the in-phase IF signal and to supply a resultant third LF signal; and (vi) a fourth IF mixing stage connected to the LO$_3$ block and the second mixer that is adapted to mix the quadrature LO$_3$ signal with the quadrature IF signal and to supply a resultant fourth LF signal.

4. The downconverter of claim 3, further including a first summing circuit that combines the first and second LF signals (to constructively add the first desired baseband signal and destructively combine the baseband image signal associated with the first desired baseband signal); and a second summing circuit that combines the third and fourth LF signals (to constructively add the second desired baseband signal and destructively combine the baseband image signal associated with the second desired baseband signal).

5. The downconverter of claim 3, wherein the first IF mixing stage includes a first IF mixer, the second IF mixing stage includes a second IF mixer the third IF mixing stage includes a third IF mixer the fourth IF mixing stage includes a fourth IF mixer.

6. The downconverter of claim 3, wherein the first IF mixing stage includes a first IF mixer that mixes the in-phase IF signal with in-phase LO$_2$ signal, and a fifth IF mixer that mixes the in-phase IF signal with quadrature LO$_2$ signal;

the second IF mixing stage includes a second mixer that mixes the quadrature IF signal with the quadrature LO$_2$ signal and a sixth IF mixer that mixes the quadrature IF signal with the in-phase LO$_2$ signal;

the third IF mixing stage includes a third mixer that mixes the in-phase IF signal with the in-phase LO$_3$ signal and a seventh mixer that mixes the in-phase IF signal with the quadrature LO$_3$ signal; and the fourth IF mixing stage includes a fourth mixer that mixes the quadrature IF signal with the quadrature LO$_3$ signal and an eighth mixer that mixes the quadrature IF signal with the in-phase LO$_3$ signal.

7. The downconverter of claim 6, further including a first summing circuit that sums the outputs of the first and second mixers; a second summer that sums tho outputs of the fifth and sixth mixers;

a third summing circuit that sums the outputs of the third and fourth mixers; and a fourth summing circuit that sums the outputs of the seventh and eighth mixers.

8. A concurrent, dual-band, image-rejection downconverter for a concurrent dual-band RF receiver having a front-end subsystem that supplies a front-end signal having two discrete desired frequency bands and a transfer function with attenuation regions at frequency bands outside the two discrete desired frequency bands, comprising:

(a) a first image-rejection downconversion stage that receives and that is adapted to simultaneously downconvert the front-end signal to two intermediate frequency (IF) bands such that the image frequency bands of the two desired frequency bands fall at the attenuation regions of the front-end transfer function, and further comprising:

(i) a front-end signal phase shifter connected to the front-end subsystem that provides a quadrature front-end signal along a quadrature front-end signal path;

(ii) a first local oscillator (LO$_1$) block adapted to supply an phase (I) signal of a first predetermined frequency;

(iii) a first mixer connected to the LO$_1$ block and the front-end subsystem that is adapted to mix the LO$_1$ signal with the front-end signal and to supply a resultant in-phase intermediate frequency (IF) signal; and (iv) a second mixer connected to the LO$_1$ block and the front-end phase-shifter and adapted to mix the LO$_1$ signal with the quadrature front-end signal and to supply a resultant quadrature IF signal, wherein the first predetermined frequency of the $LO_1$ block is offset from the midpoint of the two desired bands such that the image frequency bands of the two desired bands fall at attenuation regions of the front-end transfer function; and (b) a subsequent image-rejection downconversion stage that downconverts the two IF bands.

9. A method of concurrently downconverting a dual-band RF signal, comprising:

(a) providing a dual-band RF signal having a front-end transfer function having two desired frequency bands and attenuation notches at non-selected frequency bands; and (b) downconverting the RF signal such that the image frequencies of the two-bands fall at the attenuation notches of the front end transfer function, further comprising:

splitting the RE signal to first and second signal processing paths;

mixing the RE signal on the first path with an in-phase first local oscillator ($LO_1$) signal to produce an in-phase intermediate frequency (IF) signal;

filtering the in-phase IF signal;

mixing the RF signal on the second path with a quadrature $LO_1$ signal to produce a quadrature IF signal;

filtering the quadrature IF signal;

mixing the filtered in-phase IF signal with an in-phase second local oscillator ($LO_2$) signal;

mixing the filtered quadrature IF signal with the a quadrature $LO_2$ signal;

mixing the filtered in-phase IF signal with an in-phase $LO_3$ signal;

the filtered quadrature IF signal with the quadrature $LO_3$ signal;

adding the mixed in-phase $LO_2$ signal to the quadrature $LO_2$ signal; and subtracting the mixed in-phase $LO_3$ signal from the mixed quadrature $LO_3$, signal.

* * * * *

UNITED STATES PATENT AND TRADEMARK OFFICE
CERTIFICATE OF CORRECTION

PATENT NO. : 6,917,815 B2
DATED : July 12, 2005
INVENTOR(S) : Hajimiri et al.

It is certified that error appears in the above-identified patent and that said Letters Patent is hereby corrected as shown below:

Column 17,
Line 3, delete "(Q", and insert -- (Q) --.
Line 26, delete "RE", and insert -- RF --.
Line 41, after "adapted", insert -- to --.
Line 41, delete "(1)", and insert -- (I) --.
Line 44, delete "the first", and insert -- a first --.
Line 45, delete "the", and insert -- an --.
Line 50, delete "and the", and insert -- and a --.
Line 55, after "adapted", insert -- to --.
Line 59, make the "3" in "LO3" a subscript.

Column 18,
Line 11, delete "mixer", and insert -- mixer, --.
Line 12, delete "mixer", and insert -- mixer, and --.
Lines 16 and 18, after "with", insert -- the --.
Line 34, delete "tho", and insert -- the --.
Line 44, after "a", insert -- front-end --.
Line 59, delete "phase", and insert -- in-phase --.

Column 19,
Line 17, delete "two-bands", and insert -- two bands --.
Line 18, delete "front end", and insert -- front-end --.
Line 20, delete "RE", and insert -- RF --.

Column 20,
Line 1, delete "RE", and insert -- RF --.
Line 10, delete "the a", and insert -- a --.
Line 15, before "the filtered", insert -- mixing --.
Line 17, delete "LO2", and insert -- LO3 --, making the "3" a subscript.

UNITED STATES PATENT AND TRADEMARK OFFICE
CERTIFICATE OF CORRECTION

PATENT NO. : 6,917,815 B2
DATED : July 12, 2005
INVENTOR(S) : Hajimiri et al.

It is certified that error appears in the above-identified patent and that said Letters Patent is hereby corrected as shown below:

Column 20 (cont'd),
Line 18, delete "LO2", and insert -- LO3 --, making the "3" a subscript.

Signed and Sealed this

Eighteenth Day of October, 2005

JON W. DUDAS
*Director of the United States Patent and Trademark Office*